United States Patent Office 3,324,869
Patented June 13, 1967

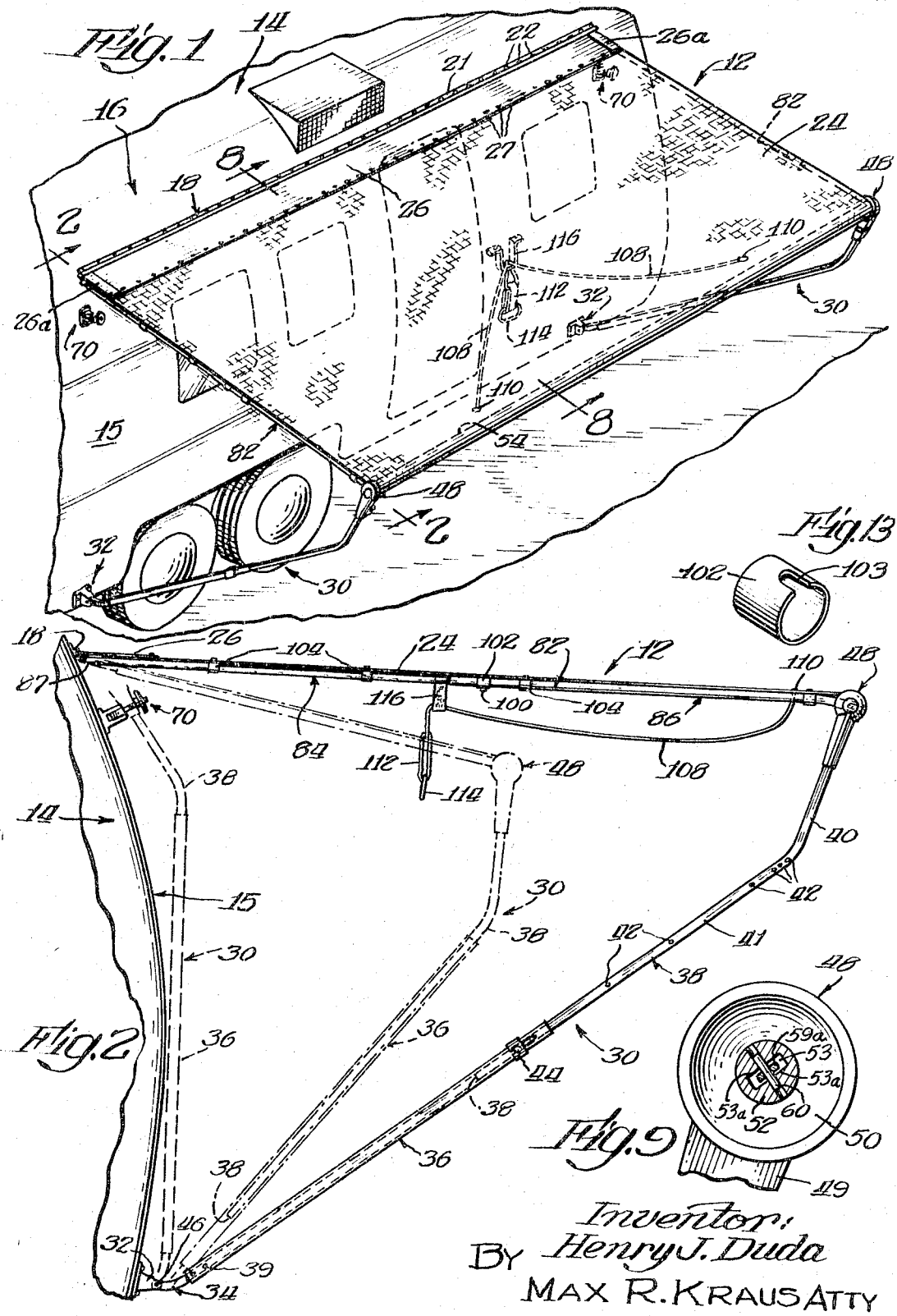

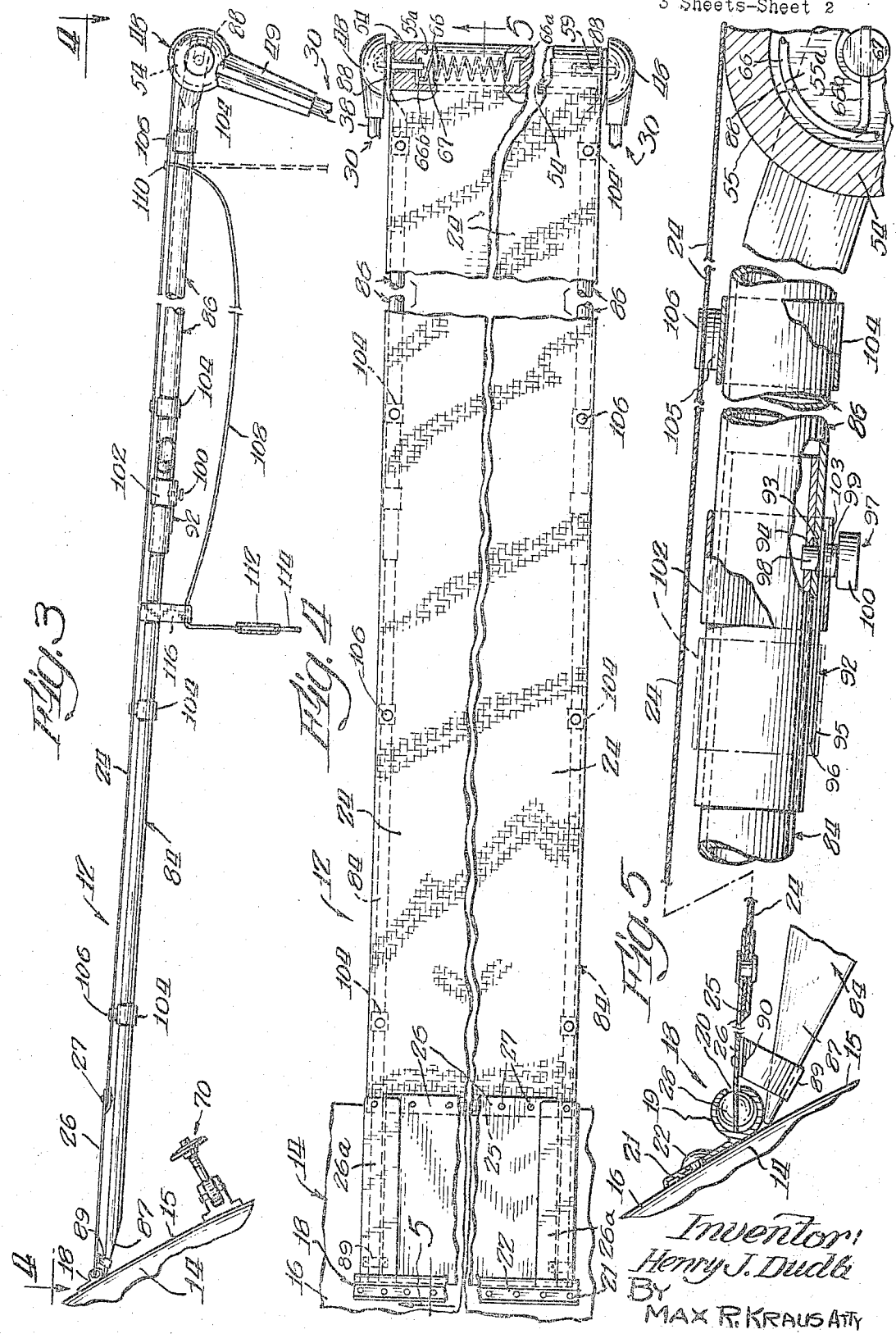

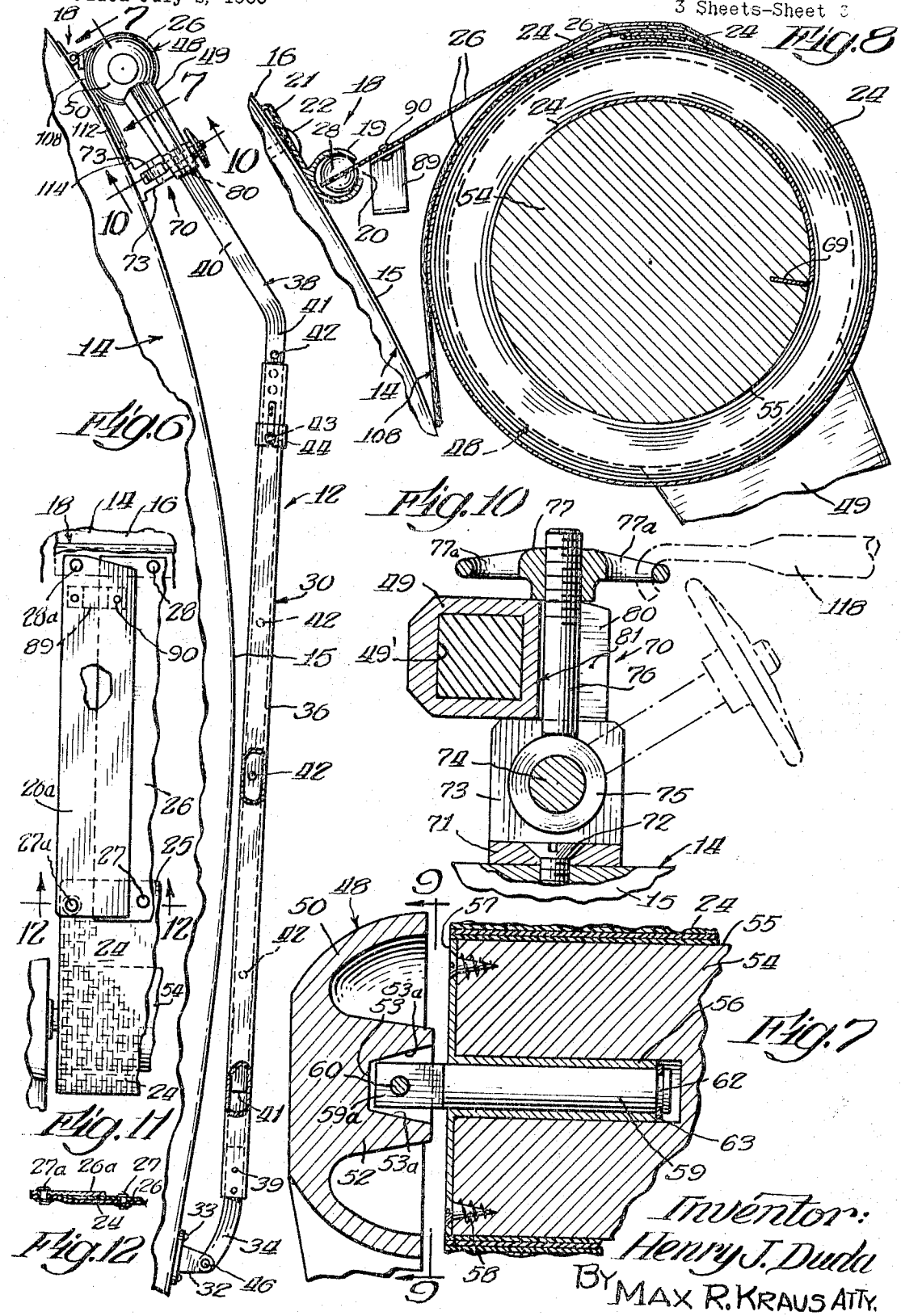

3,324,869
AWNINGS FOR TRAVEL TRAILERS
AND/OR MOBILE HOMES
Henry J. Duda, 3357 N. Newland Ave.,
Chicago, Ill. 60634
Filed July 2, 1965, Ser. No. 469,126
16 Claims. (Cl. 135—5)

This invention relates to awnings for travel trailers and/or mobile homes.

One of the objects of this invention is to provide a new and improved type of awning for a travel trailer or a mobile home wherein the awning may be permanently attached to the trailer so that it may be readily opened for use and readily closed or collapsed into non-use position, and wherein the trailer or mobile home may be moved or transported with the awning positively locked in such collapsed position.

Another object of this invention is to provide an awning in which the awning covering when rolled up, as when in closed or collapsed position, is encased within a protective enclosure and is fully protected against weather conditions, thus increasing the life of the awning covering.

Another object of this invention is to provide means to securely and positively lock the awning in either its extended or open position, or in its collapsed or closed position, thereby preventing any accidental opening or closing of same. The positive locking means which are provided require a manual actuation to unlock same.

Another object of this invention is to provide an awning with telescopic side arms which may be telescopically adjusted for the various awning positions, and wherein there is provided a pivotal relaitonship between the roller and each of the arms so that each arm may be adjusted independently of the other, which permits one person to perform this function, in contrast to awnings which require the services of two people simultaneously to effect adjustment.

Another object of this invention is to provide an awning in which the side edges of the awning covering are protected against any damage, such as fraying or abrading, even if the awning covering is not rolled properly on the roller.

Another object of this invention is to provide an awning of the foregoing character which is economical to produce, which may be applied and attached to any travel trailer or mobile home in a minimum of time and with minimum effort.

Other objects will become apparent as this description progresses.

In the drawings:

FIG. 1 is a view of the invention shown attached to a travel trailer with the awning in fully extended or open position.

FIG. 2 is a side elevational view taken on line 2—2 of FIG. 1, showing in full lines the awning in fully extended or open position, and showing in dotted lines an intermediate position.

FIG. 3 is an enlarged side elevational view of the upper portion of the awning, showing particularly the bracing member.

FIG. 4 is a plan view taken on line 4—4 of FIG. 3.

FIG. 5 is a sectional view taken on line 5—5 of FIG. 4.

FIG. 6 is a side elevational view showing the awning in closed or collapsed position and locked against opening.

FIG. 7 is an enlarged sectional view taken on line 7—7 of FIG. 6.

FIG. 8 is a sectional view taken on line 8—8 of FIG. 1 but with the awning in closed position.

FIG. 9 is a view taken on line 9—9 of FIG. 7.

FIG. 10 is a sectional view taken on line 10—10 of FIG. 6.

FIG. 11 is a top plan view taken along one of the side edges, with the awning being rolled up prior to its being in a completely collapsed position.

FIG. 12 is a section taken on line 12—12 of FIG. 11, and

FIG. 13 is a view of the sleeve of the detent.

The awning forming this invention is generally designated by the numeral 12 and it is adapted to be mounted on the side of a travel trailer or mobile home. The conventional travel trailer or mobile home is designated generally by the numeral 14, with the side of the trailer designated at 15 and the roof portion designated at 16.

Along the roof portion adjacent the side of the trailer is mounted or secured the awning rail generally designated by the numeral 18, to which the metal strip attached to the covering is secured. The awning rail includes a circular or tube-like section 19, best shown in FIG. 5, which has a longitudinally extending opening or slot 20 along the front thereof. Extending rearwardly and upwardly of said circular section at an inclined angle is a wall 21 which is provided with suitably spaced openings along the length thereof. The awning rail 18 is secured to the roof of the trailer by means of suitable fastening members or rivets 22 which pass through the openings in the wall 21.

The awning covering 24 is a flexible fabric which is rollable on a roller. The fabric is preferably Acrilan, although other types of material may be used. Secured to the inner edge 25 of the fabric covering 24 is a strip of stainless spring sheet steel 26 which is secured to the fabric by rivets or fastening elements 27. Along the outer edge of strip 26 are spacedly secured round head rivets 28 (FIG. 8) with oppositely extending heads. The strip of spring sheet steel 26 should have a width sufficient to completely encase and enclose the awning fabric 24 when same is rolled on the roller and is in collapsed or closed position, as shown in FIG. 8. This will be described in greater detail hereinafter.

As can best be seen in FIG. 11, the metal strip 26 does not extend the full length of the fabric covering 24 but terminates short of the opposite sides, approximately one inch from each side. On each of the opposite sides is a narrow strip of stainless spring sheet steel 26a of a heavier gauge than the gauge of metal strip 26. The narrow strip 26a is approximately two inches across and it extends in overlapping relation to the outer edges of the strip 26. It is secured by a single rivet or fastening member 27a to the edge of the fabric covering. The lead edge of the narrow strip 26a has a round head rivet 28a which is anchored in the awning rail 18.

The awning rail edge of strip 26 and strip 26a containing the round head rivets 28 and 28a is inserted into the circular section 19 of the awning rail 18 endwise through either of the opposite open ends of the circular section 19. The round head rivets 28 and 28a having a greater diameter than the slotted opening 20 will retain the rail edge of the awning within said circular section 19, yet provide sufficient free play and permit pivotal movement of the round head rivets 28 and 28a and the strips 26 and 26a relative to the circular section 19. The limited turning movement of the rail edges of the strips in the awning rail 18 is desirable during the rolling and unrolling of the fabric on the roller.

To support the awning there is provided a pair of side arms generally designated by the numeral 30, one positioned adjacent each of the opposite sides of the awning. The side arms are telescopic and are adapted to be pivotally supported on brackets 32 which are secured by suitable fastening means 33 to the lower side of the trailer. The side arms 30 are each formed preferably in three sections, 34, 36, 38. The connector section 34 which forms the lowest portion of the arm is formed of solid metal and is substantially square in cross-section. It has a slight radius. The lower section 36 of the arm is a square-shaped tube which is fixedly secured as at 39 to the connector section 34. The upper section 38 of the side arm is a solid square-shaped bar which is adapted to telescope within the lower section 36 of the arm. The upper portion 40 of the upper section 38 is at an inclined angle with respect to the lower portion 41, thus, the lower portion 41 of the upper section 38 telescopes within the lower section 36 of the arm to permit either the extending or collapsing of the side arm, dependent upon the position of the awning.

The lower portion 41 of the upper section 38 is provided with a plurality of spaced openings 42 and these openings are adapted to register with opening 43 in the lower section 36 and to be engaged by a detent, generally indicated at 44, carried by the lower section 36 of the side arm, for the purpose of locking the upper section 38 relative to the lower section 36 in any of the positions defined by the openings 42. The detent 44 is identical to the detent used in the stiffeners or bracing members, to be described, and hence a description of the detent in connection with said stiffeners or bracing members will suffice for the detents 44 of said arm sections.

It will be clear that the upper section 38 of the side arm is telescopically adjustable relative to the lower section 36, by reason of the spaced openings 42 in section 38 and the opening 43 in lower section 36 and the detent 44. This telescopic adjustment permits the side arms 30 to be in fully extended, or intermediate, or collapsed position. When the upper section 40 is substantially withdrawn from the lower section 36, as in full lines in FIG. 2, the awning is in its fully extended position. The dotted lines of FIG. 2 show the awning in an intermediate position and in this position the lower portion 41 of the upper section 38 is substantially telescoped into the lower section 36. When the awning is fully collapsed against the side of the trailer, as shown in FIG. 6, the upper section 38 is in the same telescoped position as it is in its intermediate position shown in FIG. 2. The connector section 34 of the arms are pivotally secured as at 46 to the brackets 32.

Fixedly supported on the upper end of the side arms 30 are members generally indicated at 48 which serve to support and grip the roller. They are best shown in FIGS. 6, 7, 9 and 10. Each of the roller supporting members 48 has a lower portion 49 provided with a square-shaped bore 49' which receives the upper end of upper square-shaped portion 40 of the upper section 38 of the arm so that it is fixedly secured thereto.

Extending upwardly of the lower portion 49 and formed integrally therewith is a head 50 provided with a central hub 52. The hub 52 has a centrally positioned rectangular-shaped bore or recess 53 with sides 53a (FIG. 7) which are angled or outwardly inclined. Thus, from the entrance of the rectangular-shaped bore the sides 53a incline inwardly.

The roller generally designated by the numeral 54 is supported by the head of the roller supporting member 48. The roller has a round body 55 with an axial bore 55a at its idler end, as shown in FIG. 7, to receive the sleeve portion 56 which extends inwardly of the circular end plate 57. The end plate is secured by screws 58 to the body 55. The sleeve 56 receives a short shaft 59. The outer end of the shaft is flattened as at 59a and extends into the rectangular-shaped bore 53 and is secured thereto by a pin 60, which in turn is anchored to the hub 52 of the head 50. The pin 60 permits a limited pivoting between the head 50 and the shaft 59 of the roller. The space between the inclined sides 53a and the sides of the flattened end 59a of the shaft provides sufficient clearance for the limited pivotal movement between the head 50 of the roller support and the roller.

The shaft 59 extends inwardly beyond the inner end of sleeve 56 and said shaft is provided with an annular groove 62 for receiving a washer 63 which rests against the inner end of the sleeve 56. The roller will rotate on the anchored shaft 59.

The opposite end, known as the motor end, of the roller 54 is supported in the other head 50 of the roller supporting member 48. The motor end of the roller is of conventional construction common to awning roller shades. It includes a conventional coil spring 66 secured inside the roller at the motor end, with one end of the spring internally anchored as at 66a to the roller and the opposite end 66b of the spring secured to the motor shaft 67. The motor shaft 67 has a flattened end similar to the flattened end 59a of shaft 59. The flattened end of motor shaft 67 is pivotally secured in the hub 52 of head 50 of the roller support, in the same manner as that previously described and shown in FIG. 7. Thus, there is a limited pivotal movement between the roller 54 and the two oppositely positioned roller supporting members 48.

The opposite end of the flexible fabric covering 24 is suitably secured or anchored to the roller as at 69. Normally, the spring tensioned roller will provide a pull or tension on the flexible awning covering 24 so that when the awning is in extended or open position, as shown in FIG. 1, there will be a tension on the awning covering to take up any slack in the awning covering. The spring tension of the roller is so set that at the fully extended open position of the awning it will not start rolling up the fabric towards its closing position. The weight of the outer end of the awning and the positioning of the roller in relation to the awning rail will prevent a rewinding of the roller without manual aid. When the awning is moved to its collapsed position the roller 54 will be caused to rotate by reason of the coil spring 66 and will roll the awning covering 24 around it, as is well understood.

As best shown in FIG. 8, when the awning is in its fully collapsed or closed position the covering 24 will be around the roller 54 and the roller will be in the position shown in said figure. In such position the spring sheet metal strip 26, as well as end strips 26a will be wrapped around the awning covering to cover same. Thus, in the collapsed position of the awning covering it is completely covered by the metal casing formed by the flexible metal strips 26 and 26a.

To maintain the awning positively locked against the side of the trailer in a collapsed or closed position, as shown in FIG. 6, there is provided locking means, best shown in FIGS. 6 and 10. Secured to the side or roof portion of the trailer adjacent the upper section 38 of the side arm is a pivotally mounted clamping unit generally designated by the numeral 70. The pivotally mounted clamping unit has a base 71 which is secured by suitable fastening means 72 to the side 15 of the trailer. Extending upwardly of the base are spaced sides 73 between which is pivotally connected through a pin 74 the hub 75 of the bolt 76. The bolt is externally threaded to receive a locking wheel provided with spaced openings 77a.

The lower portion 49 of the roller supporting member 48, previously described, has a lateral extension 80 (FIG. 10) having a recess 81 which receives the pivotally supported bolt 76. The locking wheel 77 will lock the awning in the closed position (FIG. 6) to the side of the trailed. One of such clamping units 70 is positioned adjacent each of the opposite arms, thus, when locked or secured, as shown, the awning cannot be moved to extended or open position. By rotating and loosening the locking wheel 77 on the bolt 76 and then pivoting the bolt approximately 45° out of the recess 81, the arms 30 would be free to be pivoted outwardly to the awning extended position. Thus, with the awning locked the trailer may be moved or transported without fear of the awning accidentally moving to open or extended position.

To more positively support the awning in open or extended position there is provided a pair of telescopic stiffeners or bracing members generally indicated at 82, which are removable and which when in extended position, as shown in FIGS. 1, 2 and 3, serve to firmly lock the awning in its extended or open position. A bracing member 82 is positioned on each side of the awning and both are identical. The bracing member, best shown in FIGS. 3 and 5, is formed of two sections designated by the numerals 84 and 86. Section 84 is tubular and has its end tapered as at 87. The opposite end of said section telescopes within the tubular section 86. The opposite end of tubular section 86 is pressed together to form a generally flattened tip and is bent or curved outwardly and terminates in a flattened bifurcated end 88, so that the bifurcated end engages the shafts 59 of the roller be- 50, as may be best seen in FIGS. 3 and 4. This supports tween the opposite ends of the roller 54 and the head one end of each of the bracing members. The opposite tapered end 87 of the bracing member is positioned in a stainless metal strip 89, which in turn is suitably secured by rivets 90, or otherwise fastened to the end metal strip 26a and strip 26. In bracing position the tapered end 87 of the bracing member would bear against the side wall of the trailer, as seen in FIG. 3.

The telescopic bracing members 82 when secured in their bracing position maintain the awning in either its fully extended or intermediate position, as desired. However, when the awning is to be collapsed the said bracing members are removed from their position shown, for it will be understood that with the bracing members in position the awning may not be collapsed or rolled up. The bracing members when not in use may be stored away in the trailer.

The sectional view shown in FIG. 5 shows the detent for locking section 86 with respect to section 84 of the bracing members in any of their adjusted positions. FIG. 13 shows the sleeve used with said detent. The detent, generally indicated by the numeral 92, is identical to the detents 44 in connection with the side arms, previously referred to but not described in detail, and the description of the detent 92 now will serve to describe the same type of detent 44 used in connection with the side arms.

The outer tubular section 86 has an opening 93 and the inner tubular section 84 has a plurality of spaced openings 94 which are to be alined with opening 93, dependent upon the telescopic position of the sections. On the outer tubular section 86 there is secured by suitable rivets or other fastening means 95 a leaf spring 96. Fixedly supported adjacent the opposite end of the spring is a pin 97 having a reduced end 98 which enters the two alined openings 93 and 94. The pin also has an enlargement 99 and a manually engageable knob 100. Normally, the leaf spring 96 will urge the pin inwardly so that when the inner end of the pin registers with the openings of the two tubular members the pin will stay in said locking position. However, to permit sliding telescopic movement between the tubular sections 84 and 86, the knob 100 is manually engaged and the pin pulled out against the tension of the spring 96 to permit adjustment and relatively sliding movement between the members. When the knob 100 is released the leaf spring 96 will urge the pin 94 inwardly.

As a positive locking means to prevent the pin from being withdrawn accidentally there is provided a slidable sleeve 102 (FIG. 13) which is slidable on the outer tubular member 86. The slidable sleeve 102 has a slotted portion 103 which engages the enlarged portion 99 of the pin. When the sleeve 102 is moved so that the slotted portion 103 engages the enlarged portion 99 of the pin, the sleeve will be over the leaf spring 96 and the knob 100 cannot be manually moved outwardly to withdraw the pin. There can, therefore, be no accidental collapsing of the bracing members. The unlocking of the bracing sections must be by positive action. It is only when the sleeve 102 is manually slid away from its position over the leaf spring 96 that the pin 97 may be manually withdrawn. This detent arrangement is similar to the detent 44 on the side arm, with the obvious difference that in the detent 44 the slidable sleeve, which would correspond to sleeve 102, would be of a square shape in cross-section, since it slides on the square-shaped tubular member 36.

The telescopic bracing members 82 are also provided with sleeve-like members 104 slidable thereon which support a conventional snap-type of fastening member 105. Complementary snap-type fastening means 106 are secured to the fabric awning along the side edges thereof so that the sleeve 104 may be secured to the awning covering. This attaches the side edges of the awning covering to the bracing members and helps to reinforce the open or extended position of the awning. The bracing members may be readily detached from the awning covering by detaching the fasteners 105 from fasteners 106.

As shown in FIGS. 1 and 2, there is provided an attachment which may be a strip of flexible material or string 108 which has its opposite spaced ends stitched or otherwise secured as at 110 to the awning covering 24 adjacent the outer edge thereof. The string extends rearwardly and comes together at the center to which is attached a flexible loop 112 having a metal ring 114. A flexible strap 116 is secured to the fabric covering through which the string 108 extends. When the awning is rolled up on the roller and is in collapsed position the string 108 will also be rolled on to the roller, however, the loop 112 and metal ring 114 will extend outwardly and downwardly of the roller to be manually engaged.

When it is desired to start unrolling or opening the awning, a manual pull by engaging the ring 114 will cause the roller 54 to start unrolling, thereby facilitating the opening of the awning. After the awning has been unrolled a short distance it will then be relatively easy to complete the unrolling. By this structure one person may unroll the awning.

By the use of a stick or rod with a hooked end 118 (FIG. 10) the clamping wheel 77 may be engaged through the openings 77a for the purpose of rotating same in either locking or unlocking position. Likewise, the hook 118 may be used to engage the ring 114 and a manual pull down can be exerted to start the unrolling of the roller. It is therefore not necessary for a person to climb on a chair or use a ladder to reach these members. This can be done by standing on the ground and reaching with the hook member 118.

The awning of this invention may be rolled up and unrolled by one person. The limited pivoting action between the roller and the side arms permits each side arm to be independently telescopically adjusted by one person, in contrast to those structures which require the two side arms to be simultaneously adjusted, thus requiring two people to perform the act simultaneously.

Even if the fabric awning covering is not rolled properly on the roller when the awning is in its collapsed position, it will not be damaged, nor will the edges become frayed or abraded, as the heavier overlapping metal end strips 26a will provide the necessary structure to prevent the occurrence of the foregoing objectionable features.

With the awning in collapsed position the trailer may be moved and transported without the possibility of its accidental opening during transit. When the awning is in its open or extended position it is positively locked and will not accidentally close.

It will be understood that various changes and modifications may be made from the foregoing without departing from the spirit and scope of the appended claims.

What is claimed is:

1. An awning for a travel trailer or mobile home, said awning comprising a pair of side arms, one on each side, pivotally secured to the side of the trailer, a roller supported at the upper ends of said arms, a flexible awning covering having one end thereof secured to said roller to be wound around said roller, a strip of metal secured to the opposite end of the flexible covering, with the opposite end of the metal strip attached to the side of the trailer so that when the flexible covering is rolled around said roller as when the awning is collapsed the flexible strip will be rolled around said flexible covering and form a casing therefor, said roller having spring means for tensioning said roller.

2. A structure defined in claim 1 in which the side arms each comprise a plurality of sections relative to each other.

3. A structure defined in claim 2 in which locking means are provided on said arms for locking said sections relative to each other in a plurality of adjusted positions.

4. A structure defined in claim 2 in which a detent is provided for locking the sections in their respective adjusted positions and a sliding sleeve is movable with respect to said detent to prevent accidental unlocking of said detent.

5. A structure defined in claim 1 in which pivoted locking means are provided for locking the awning against the trailer when it is in retracted position.

6. A structure defined in claim 5 in which said pivoted locking means includes a pivoted clamping bolt engaging the side arm.

7. A structure defined in claim 1 in which an awning rail is secured to the side of the trailer adjacent the roof thereof and in which the opposite end of the metal strip has means which anchor said strip in said awning rail.

8. A structure defined in claim 7 in which the means for anchoring the strip in the awning rail includes double headed rivets.

9. A structure defined in claim 1 in which bracing members are positioned adjacent and along the side edges of the flexible covering when the awning is in extended position, with said members secured between the trailer and the roller to prevent collapsing or closing of said awning.

10. A structure defined in claim 9 in which the bracing members have telescoping sections.

11. A structure defined in claim 10 in which a detent is provided for locking the telescopic sections in extended position, and a sliding sleeve is movable with respect to said detent to prevent accidental unlocking of said detent.

12. A structure defined in claim 9 in which the outer end of one of the sections engages the shaft of the roller.

13. A structure defined in claim 9 in which the bracing bar has detachable locking means engageable with locking means on the edges of the flexible awning covering.

14. A structure defined in claim 1 in which a pull cord is secured to the flexible awning covering so that a portion of said cord extends outwardly for manual engagement when the awning is rolled on said roller.

15. A structure defined in claim 1 in which the strip of metal extends short of the opposite sides of the flexible covering and in which a narrow metal strip of heavier gauge material is positioned over each opposite side adjacent said first strip in overlapping relation to said first strip.

16. A structure defined in claim 15 in which the narrower metal strips are each secured to the flexible covering at one point.

References Cited
UNITED STATES PATENTS

| | | | |
|---|---|---|---|
| 1,181,715 | 5/1916 | Wyatt | 160—71 X |
| 1,595,887 | 8/1926 | Spaulding | 160—65 |
| 2,423,402 | 7/1947 | Olsen | 135—5 |
| 2,477,167 | 7/1949 | Bliss | 287—58 X |
| 2,627,865 | 2/1953 | Mitchell | 135—5 |
| 2,853,128 | 9/1958 | Bomerscheim | 160—81 X |
| 2,906,323 | 9/1959 | Macy | 160—68 X |

FOREIGN PATENTS 311,269    5/1919    Germany.

REINALDO P. MACHADO, *Primary Examiner.*